United States Patent [19]

Delago

[11] Patent Number: 5,746,148
[45] Date of Patent: May 5, 1998

[54] RADIAL SUPPORT ASSEMBLY FOR AN APPARATUS FOR POSITIONING A VESSEL

[76] Inventor: Pierre C. Delago, 15049 S. Afton Hills Dr., Afton, Minn. 55001

[21] Appl. No.: 644,712

[22] Filed: May 10, 1996

Related U.S. Application Data

[63] Continuation-in-part of Ser. No. 339,832, Nov. 14, 1994.
[51] Int. Cl.$^6$ ................................................. B63B 21/50
[52] U.S. Cl. ................................................. 114/230; 114/293
[58] Field of Search ................................... 114/230, 293; 441/3–5; 166/354, 355

[56] References Cited

U.S. PATENT DOCUMENTS

| | | | |
|---|---|---|---|
| 3,279,404 | 10/1966 | Richardson | 441/3 |
| 4,698,038 | 10/1987 | Key et al. | 441/5 |
| 4,701,143 | 10/1987 | Key et al. | 441/5 |

FOREIGN PATENT DOCUMENTS

| | | | |
|---|---|---|---|
| 157488 | 7/1986 | Japan | 114/293 |

*Primary Examiner*—Sherman Basinger
*Attorney, Agent, or Firm*—Dorsey & Whitney LLP

[57] ABSTRACT

A radial roller assembly for passively providing radial support to a cylindrical turret to resist horizontal forces. The turret is moored to the sea bottom for rotation of a vessel around the turret, where the vessel includes a circumturret passing through the vessel and surrounding the turret. The radial roller assembly comprises an outer housing, which is connected to the circumturret and an inner support carriage, which is located within the outer housing. The inner support carriage has a wheel support assembly for supporting a wheel which has its outer bearing surface in contact with a circular radial support rail attached to the turret. There is a bearing structure interposed between the outer housing and the inner support carriage for slidably connecting the inner support carriage and the outer housing. The radial roller assembly further comprises a guide shaft, which is connected to the circumturret so that the guide shaft can be tilted slightly. The second end of the guide shaft is slidably connected to the inner support carriage. A plurality of springs having a bore for slidably receiving the guide shaft are placed on the guide shaft. The springs are located within the inner support carriage and the wheel support assembly.

16 Claims, 12 Drawing Sheets

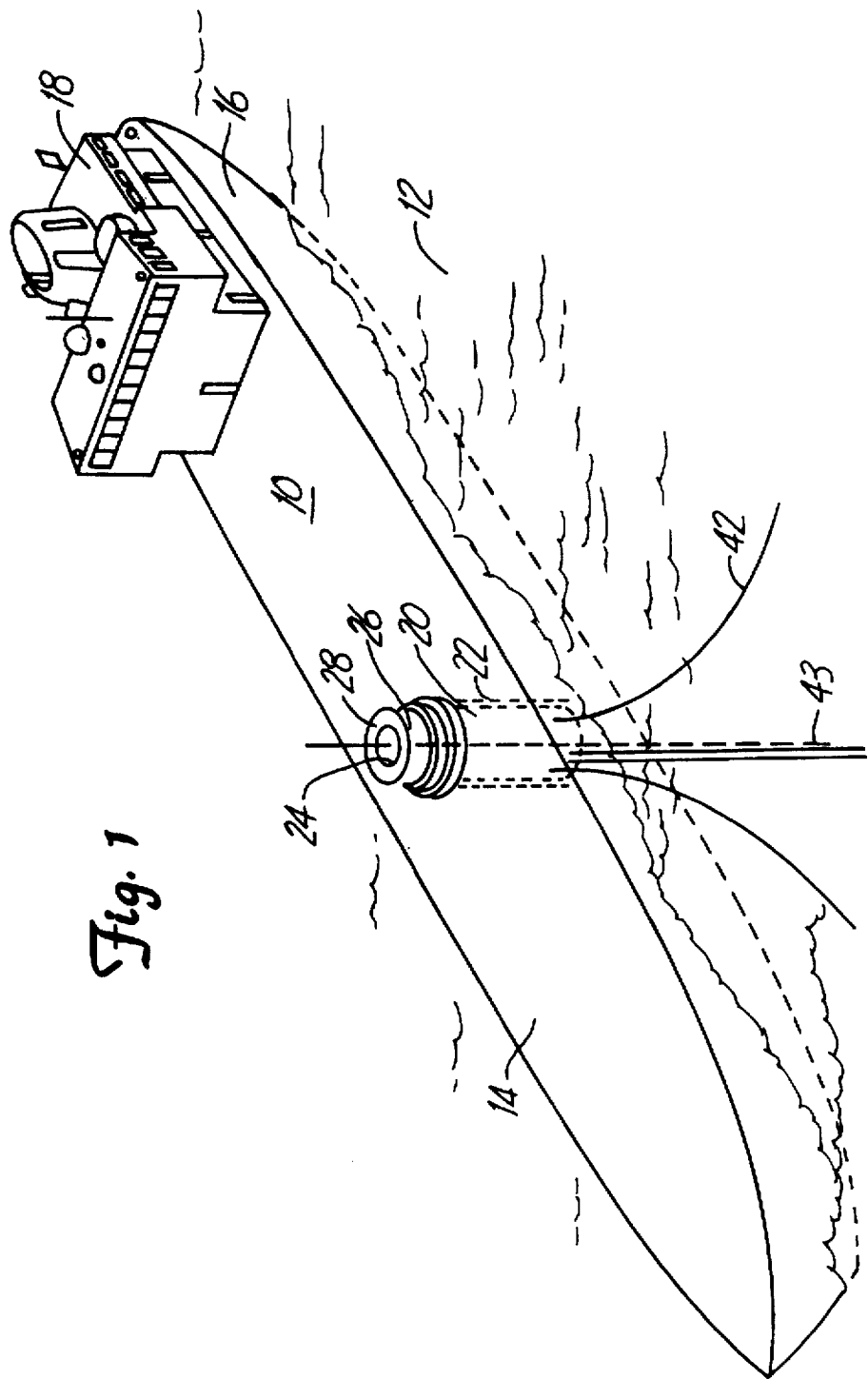

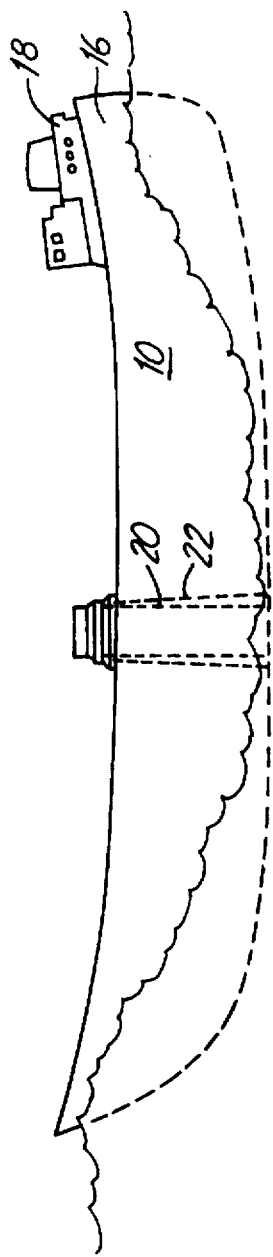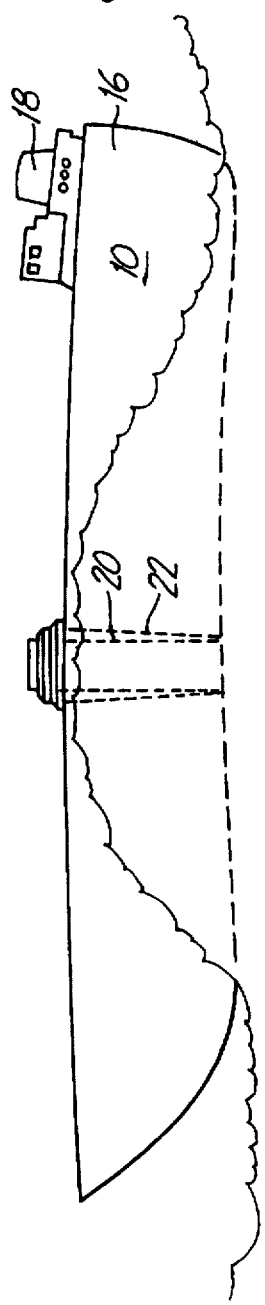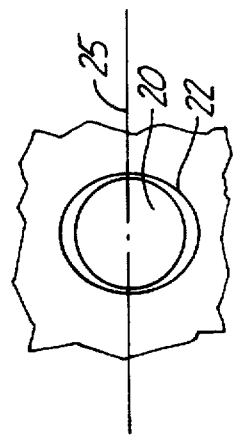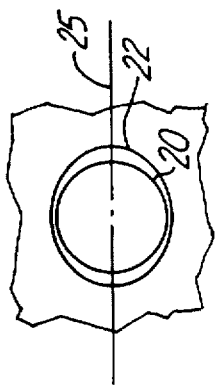

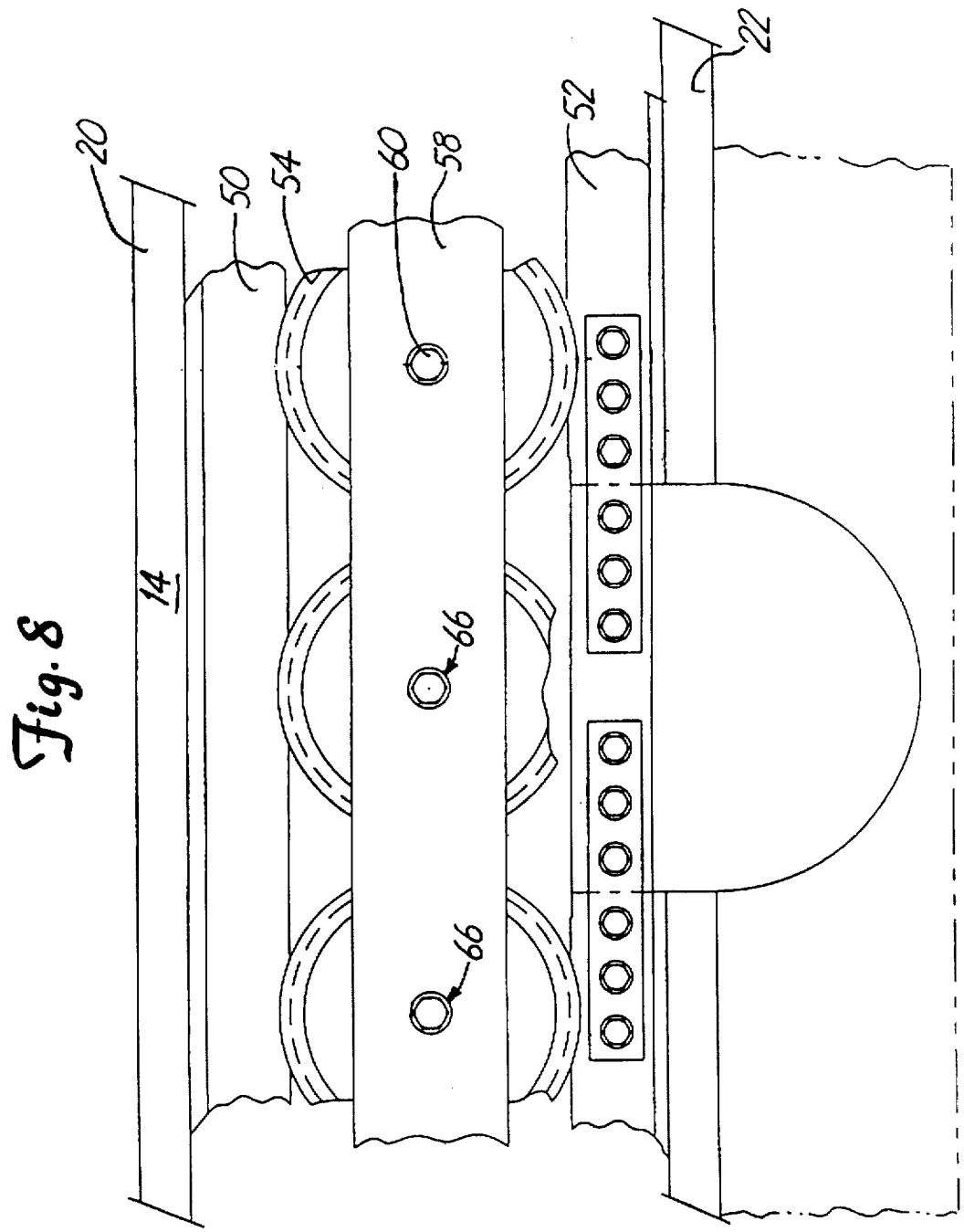

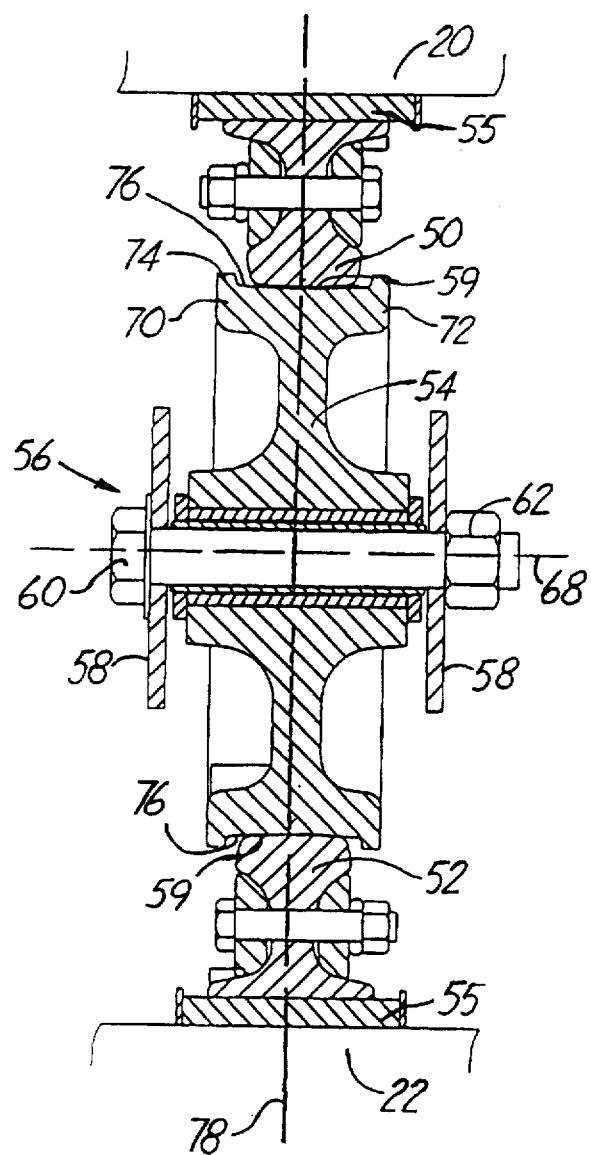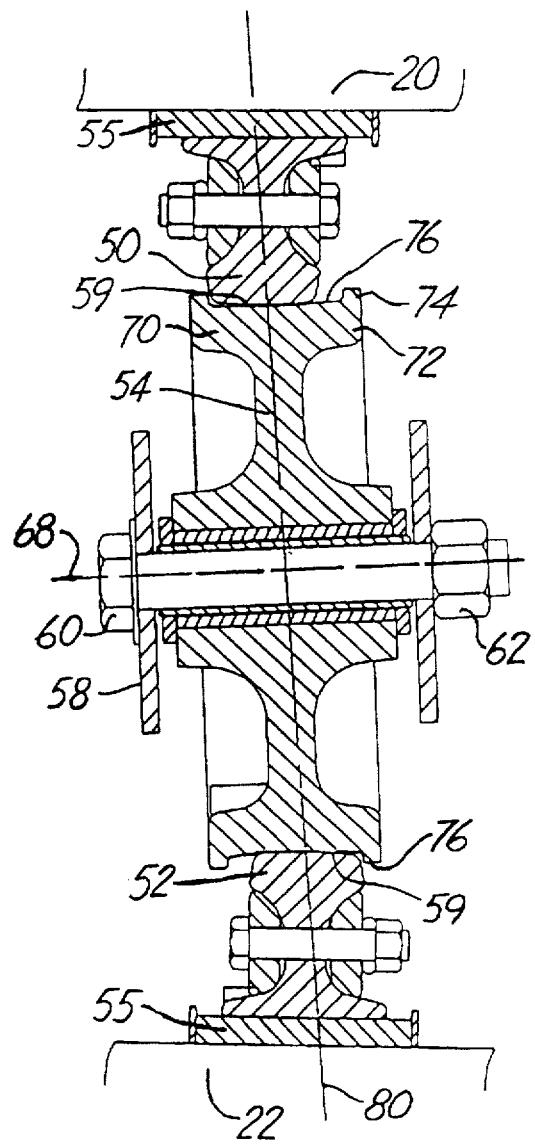

5,746,148

RADIAL SUPPORT ASSEMBLY FOR AN APPARATUS FOR POSITIONING A VESSEL

This is a continuation-in-part of application Ser. No. 08/339,832, filed Nov. 14, 1994.

TECHNICAL FIELD

The present invention relates to an apparatus for positioning a moored, floating vessel around a turret. In particular, it relates to a passive radial support assembly for such an apparatus.

BACKGROUND OF THE INVENTION

In offshore production of oil and other subaqueous minerals, an alternate to bottom mounted towers that extend above the surface of the water is to provide a portion of the production facilities on the sea floor and to provide a permanently moored floating facility for the balance. When this is done, a substantially vertically extending conduit or riser must be provided between the sea floor and the floating facility. Mooring lines are used to anchor the facility to the sea floor. These mooring lines and risers which are connected to the vessel via a turret must be kept from being twisted when the vessel turns (i.e., windvanes) in response to wind, waves, and current forces.

U.S. Pat. No. 3,602,175 to Morgan discloses a vessel having a rotatable plug or mooring swivel therethrough near the bow for mooring to the bottom and accommodating a riser passing therethrough. The Morgan patent discloses a ball bearing system for the plug or swivel to keep the mooring lines and risers in the proper position as the rotatable plug swivels within the vessel. This pivoting means is integrally built into the mooring vessel.

U.S. Pat. No. 4,305,341 to Stafford discloses a spindle in a vessel wherein radial-thrust bearings at the top and bottom side portions of the spindle and vertical-thrust bearings along the side of the spindle permit the vessel to windvane about the spindle.

A problem with the bearing systems in the Morgan and Stafford patents is the flexing of the bearing surfaces. Depending on the loads placed on a vessel, the vessel can be in a "hog" condition or a "sag" condition. When a vessel is in a "hog" condition, the deck of the vessel is in tension and has a convex surface. When a vessel is in a "sag" condition, the deck of the vessel is in compression and has a concave surface. The "hog" condition occurs when the vessel is not loaded and the "sag" condition occurs when the vessel is fully loaded. However, the degree of "hog" and "sag" dynamically changes, based on the forces exerted on the vessel by the wind, waves, and ocean currents.

The result of the hog or sag condition is that the normally circular bearing housing will assume various elliptical forms as the vessel changes from compression to tension conditions alternately at the main deck and bottom. There are no known steel roller bearing arrangements that can accommodate this elliptical distortion condition and yet retain tolerable friction losses.

Clearly, there is a need for a turret bearing apparatus that will accommodate the hog and sag conditions and permit rotation of the vessel around a turret, such that the mooring lines are not twisted. Also, needed is an apparatus that dynamically adjusts its radial support of the turret.

However, some radial support assemblies use hydraulic cylinders to support the load. The problem with such systems is that the hydraulic cylinders leak. Clearly, a passive system that requires no monitoring would be desirable.

SUMMARY OF THE INVENTION

A radial roller assembly for passively providing radial support to a cylindrical turret to resist horizontal forces. The turret is moored to the sea bottom for rotation of a vessel around the turret, where the vessel includes a circumturret passing through the vessel and surrounding the turret. The radial roller assembly comprises an outer housing. This outer housing is connected to the circumturret.

An inner support carriage is located within the outer housing. The inner support carriage has a wheel support assembly for supporting a wheel. This wheel which has its outer bearing surface in contact with a circular radial support rail attached to the turret. There is a bearing structure interposed between the outer housing and the inner support carriage for slidably connecting the inner support carriage and the outer housing. A guide pin connects the outer housing to the inner support carriage such that the outer bearing surface of the wheel is in contact with the rail.

The radial roller assembly further comprises a guide shaft having a first end and a second end. The first end of the guide shaft is connected to the circumturret so that the guide shaft can be tilted slightly. This type of connection limits the chance of fatigue cracking the guide shaft.

The second end of the guide shaft is slidably connected to the inner support carriage. A plurality of springs having a bore for slidably receiving the guide shaft are placed on the guide shaft. The springs are located within the inner support carriage and the wheel support assembly.

When a load is placed on the radial roller assembly, the wheel support assembly will place a load on the springs. The inner support carriage will slide on the bearing structure. All of the load is supported by the springs. Thus, the radial support assembly (1) provides radial support to the turret regardless of the shape of the circumturret, and (2) equalizes the loads on the turret so that the cylindrical shape of the turret is preserved.

BRIEF DESCRIPTION OF THE DRAWINGS

FIG. 1 is a perspective view of the invention installed within the hull of a ship.

FIG. 2 is a side elevational diagram of a ship with the ship in the sag condition.

FIG. 3 is a side elevational diagram of a ship with the ship in the hog condition.

FIG. 4 is a simplified top plan detail of the turret and circumturret in the sag condition shown in FIG. 2.

FIG. 5 is a simplified top plan detail of the turret and circumturret in the hog condition shown in FIG. 3.

FIG. 8 is a side elevational view of a plurality of wheels between an upper rail and a lower rail.

FIG. 9 is a sectional elevation of a wheel and rails taken along line 9—9 in FIG. 8.

FIG. 10 is a sectional elevation of a wheel and rails showing the wheel being displaced due to the hog or sag condition of the ship.

DETAILED DESCRIPTION OF THE PREFERRED EMBODIMENT

Figure 6:
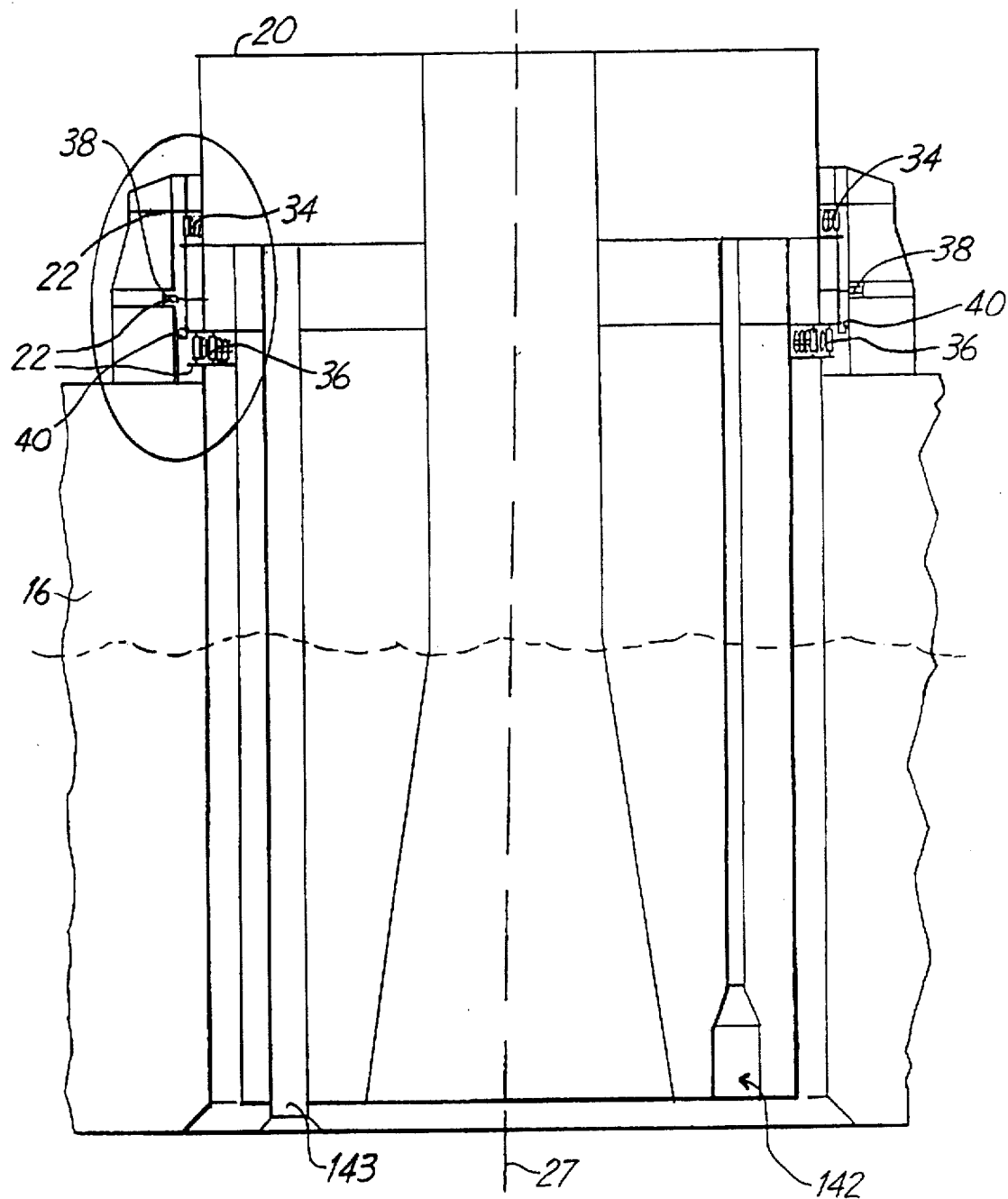
FIG. 6 is a simplified fragmentary side elevational view of the ship with the hull, circumturret structure, and turret structure shown sectioned vertically along the longitudinal axis of the ship.

FIG. 1 shows a vessel 10 floating on the water 12. The floating vessel 10 comprises a deck 14, a hull 16, a bridge 18, a turret 20, and a circumturret 22. The turret 20 has a substantially cylindrical structure with an inner surface 24, and outer surface 26, a top surface 28, and a bottom surface 30. The circumturret structure 22 is part of the vessel 10 and is the structure which supports the turret structure 20. Mooring lines 42 and risers 43 extend downward from the turret 20.

With reference to FIGS. 2–5, the sag and hog conditions of the vessel 10 will be described. (All figures are somewhat exaggerated for purposes of explanation.) FIG. 2 shows a vessel 10 in a sag condition. That is, the deck 14 of the vessel 10 has a concave shape. FIG. 3 shows a vessel 10 in a hog condition. That is, the deck 14 has a convex shape. Moreover, the hog or sag condition of the vessel 10 changes dynamically due to the forces exerted on the vessel 10 by wind, wave, and current forces working against forces in the mooring lines 42. When a vessel 10 is in a hog or sag condition, the turret structure 20 maintains its generally cylindrical shape. However, the circumturret structure 22 changes its cross-sectional shape from a circle to an ellipse.

FIGS. 4 and 5 show a top view of the turret 20 and the circumturret 22 structures. The axis 25 represents a longitudinal axis running from bow to stern of the vessel 10 and through the turret 20. As seen in FIG. 4, when the ship is in a sag condition (as shown in FIG. 2), a turret 20 has a circular cross-section and the circumturret 22 has an elliptical cross-section with the longer axis of the ellipse transverse to the longitudinal axis 25. Similarly, as shown in FIG. 5, when the vessel is in a hog condition (as shown in FIG. 3), the turret 20 has a circular cross-section, however the circumturret 22 now has an elliptical cross-section with the longer axis of the ellipse coincident with the longitudinal axis 25. Consequently, when the vessel 10 is in a hog or sag condition, the circumturret structure 22 no longer conforms to the shape of the turret structure 20, thereby potentially distorting the bearing structure for the turret 20 and preventing the circumturret structure 22 from smoothly turning (i.e., windvaning) about the turret structure 20.

The present invention discloses a bearing apparatus which enables a person to turn the vessel 10 about the turret 20 regardless of whether the vessel 10 is in a hog or sag condition. Moreover, the apparatus adjusts to the dynamically changing shape of the circumturret structure 22 so that (1) the turret structure 22 is always supported substantially uniformly in the radial direction, and (2) the vessel 10 can always be rotated about the turret 20. The bearing structure accommodates such changes, which affect the position of the circumturret structure 22 to the turret structure 20.

FIG. 6 shows the hull 16, the turret 20, and the circumturret 22 sectioned along the longitudinal axis 27 of the turret 20. The circumturret structure 22 supports the turret structure 20 via a hook roller assembly 34, a load roller assembly 36, and a radial roller assembly 38. Also, a partial view of the drive mechanism 40 for moving the circumturret structure 22 around the turret structure 20 is shown. Each mooring line 42 extends through a mooring line tube 142, is connected to the turret 20, and extends to the bottom of the sea floor to anchor the vessel 10 to the sea floor (not shown). Generally, at least eight such mooring lines are used to anchor the vessel 10 to the sea floor. Each riser 43 extends through a riser tube 143 and extends to the undersea production facility (not shown). When the vessel 10 turns due to the wind, wave, and current forces exerted on the vessel 10, unless an adequate turret structure exists, the mooring lines 42 and risers 43 may become twisted. The apparatus of the present invention allows the user to turn the vessel around the turret structure 20, thereby keeping the mooring lines 42 and risers 43 from becoming twisted.

The turret 20 must remain rotationally static about a vertical axis 27 in the vessel 10 as the vessel 10 turns (weathervanes) in response to wind, wave, and current forces. Since the mooring lines 42 cannot withstand any significant twisting below the turret 20, the vessel 10 must be repositioned in relation to the turret 20 so that the mooring lines 20 are kept in the proper position. That is, as an operator turns the vessel 10 using thrusters (not shown) on the vessel in response to wind, wave, and current forces, the mooring lines 42 may start twisting. The apparatus of the present invention will provide the operator of the vessel 10, regardless of the shape of the circumturret structure 22, the means to reposition the vessel 10 around the turret 20 so that the mooring lines 42 are not twisted.

As will be explained in greater detail below, the hook roller assembly 34 prevents the turret 20 from moving upwards. The load roller assembly 36 supports the turret 20. The hook and load roller assemblies 34, 36 also permit the vessel 10 to be rotated around the turret 20. Further, a radial roller assembly 38, which is mounted on the circumturret structure 22, provides radial support to the turret 20. The drive mechanism 40 provides the means by which the operator can rotate the vessel 10 around the turret 20.

Hook and Load Roller Assemblies

Figure 7:
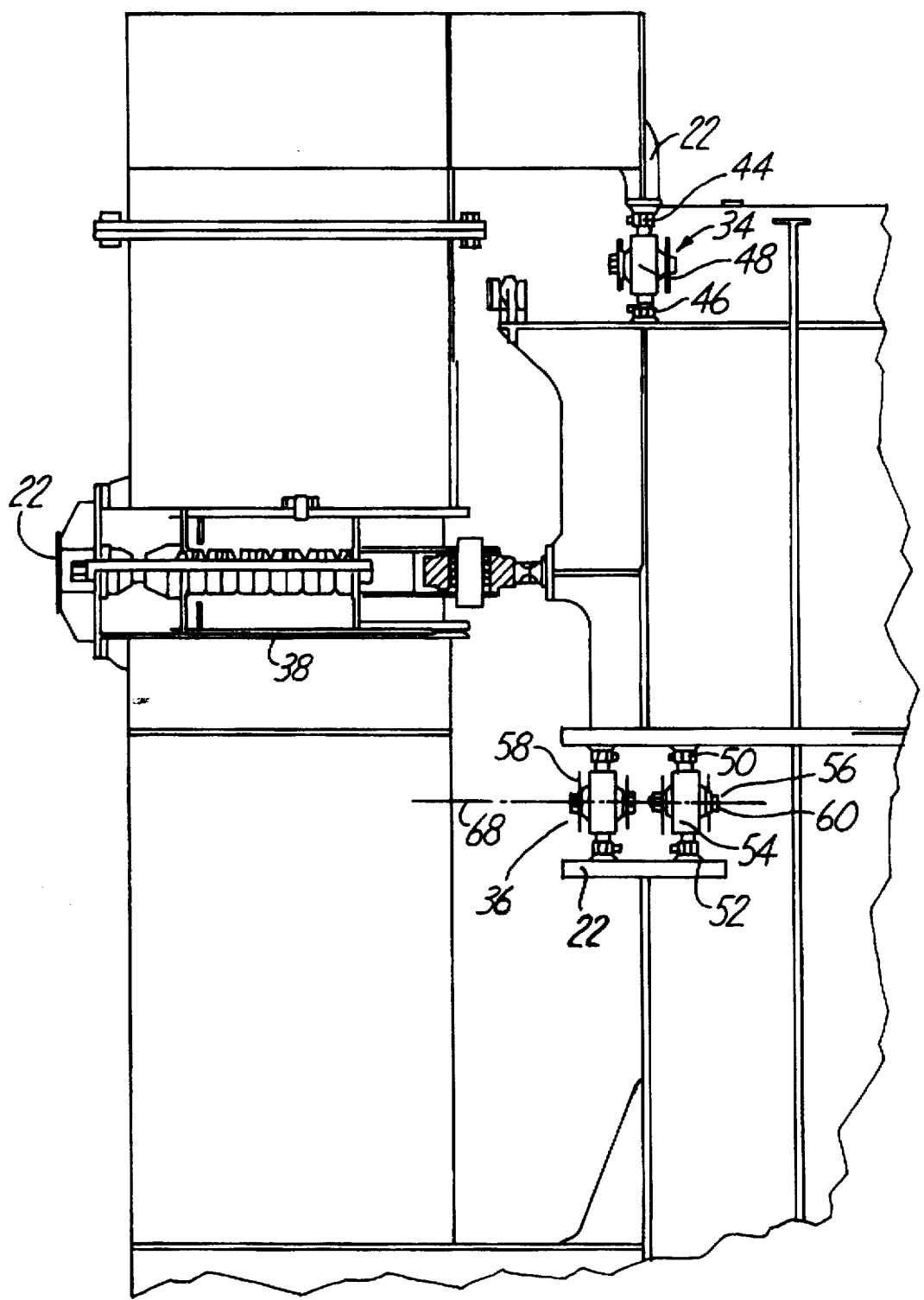
FIG. 7 shows the hook roller assembly, the load roller assembly, and the radial roller assembly mounted on the turret and circumturret structures.

FIG. 7 shows the hook roller assembly 34, the load roller assembly 36, and the radial roller assembly 38 in greater detail. Each of these assemblies will now be described.

The hook and load roller assemblies 34, 36 allow the circumturret structure 22 to be rotated about the turret structure 20. The hook roller assembly 34 prevents the turret 20 from moving upward due to the forces exerted on the vessel by the wind, wave and current forces as the vessel 10 is floating on the water 12. The load roller assembly 36 supports the turret structure 20.

The hook roller assembly 34 comprises an upper hook rail 44, a lower hook rail 46, and a plurality of wheels 48 between the upper and lower hook rails 44, 46. The upper hook rail 44 is found in a horizontal circle and attached to the circumturret structure 22. Similarly, the lower hook rail 46 is circular and attached to the turret 20. Each of the wheels 48 are rotatably supported between the upper hook rail 44 and the lower hook rail 46.

Continuing to refer to FIG. 7, the load roller assembly 36 will now be described. The load roller assembly 36 comprises at least one upper load rail 50, at least one lower load rail 52, and a plurality of wheels 54 between the upper and lower rails 50, 52. The upper load rail 50 is formed in a horizontal circle and is connected to the turret 20. Similarly, the lower load rail 52 is formed in a horizontal circle and is attached to the circumturret structure 22. Each of the wheels 54 is rotatably supported between the upper load rail 50 and the lower load rail 52. In the preferred embodiment, a pair of upper load rails 50 and a pair of lower load rails 52 with two corresponding sets of wheels 54 are used to support the turret 20.

With reference to FIGS. 7 and 8, the wheels and the wheel retention and rotation assembly 56 that comprises the support structure for securing the wheels of both the hook roller assembly 34 and the load roller assembly 36 will be described. Because the rails and wheels used in both assemblies 34, 36 are identical, this description will be with reference to the load roller assembly 36 and is equally applicable to the hook roller assembly 34. At the center of each wheel 54, there is a bore for receiving a pin 60 or a similar support structure about which the wheel 54 can rotate.

Each wheel 54 is held between the upper load rail 50 and the lower load rail 52 by the wheel retention and rotation assembly 56. The retention and rotation assembly 56 comprises a pair of spaced, substantially concentric, circular metal strips 58; pins 60; and fasteners 62. The wheel 54 is fastened to a pair of metal strips 58. Each strip has a set of spaced bores 66 for receiving pins 60, such that each bore 66 on each strip 58 can be radially aligned with a bore 66 on the other strip 58. The pin 60 extends through both bores 66 and a center bore 64 in the wheel 54. A fastener 62 is used at each and of pin 60 to secure the pin 60 so that the pin 60 does not slide out of the bores in the strips and wheel. Each wheel 54 can rotate around the horizontal axis 68 of the pin 60.

FIG. 8 shows the wheel retention and rotation assembly 56 in conjunction with the wheels 54, the upper and lower load rails 50, 52, the turret structure 20, and the circumturret structure 22. Each bore 60 is spaced from the next adjacent bore 60 by a distance greater than the diameter of wheels 54. When the wheel 54 rotates on the rails 50, 52 about the axis 68 of the pin 60, the wheel 58 will not make contact with another wheel 58 in the wheel assembly 56. As the wheels 54 rotate, the circumturret structure 22 can rotate about the turret structure 20. Consequently, since the circumturret structure 22 is part of the vessel 10, the vessel 10 rotates about the turret structure 20.

FIG. 9 shows a cross-section of one wheel 54 secured to the metal strips 58 of the wheel retention and rotation assembly 56 by the pin 60 and fastener 62. As shown in FIG. 9., the wheel 54 is in contact with the upper and lower load rail 50, 52. Moreover, the rails 50, 52 are bolted to the turret structure 20 and the circumturret structure 22. The surface on which the rail surface is bolted must be flat. Consequently, a layer of epoxy resin 55 is applied to the surface of the rail adjacent to the turret 20. For supporting a turret 20 having a diameter of 20 meters, an epoxy layer between ¾" to 1½" is used. An alternative to using epoxy resin is to have the surface machined.

The rails 50, 52 are standard rails having curved heads 59 which can be purchased directly from a rail manufacturer. The heads 59 of the rails 50, 52 have a convex shape. In this apparatus, before the rail 50, 52 is attached to the outer surface 26 of the turret structure 20, each rail must be bent so they together form a generally circular shape conforming to the turret 20. By using a standard, commercially available rail to construct the apparatus of the present invention which needs to be bent but needs no significant machining, the cost of constructing this apparatus is greatly reduced.

The wheel 54 has a first side 70 and a second side 72 which are substantially parallel to each other. A pair of flanges 74 extend outwardly from the first and second sides 70, 72. The outer bearing surface 76 has a concave shape. As will be explained in greater detail below, this concave outer bearing surface 76 prevents the wheel from disengaging from the rails 50, 52 when the vessel 10 is in a hog or sag condition. This concave outer bearing surface 76 is custom formed for this apparatus. Each of the wheel surfaces 76 are machined to have a selected curvature.

The present invention uses rails with convex shaped heads 59 and wheels 54 with concave outer bearing surfaces 76 so that there no significant change is the mating surface between the wheel 54 and the rail when the wheel is displaced between the rails. The mating surface of the wheel 54 and the rail 50, 52 is determined by the radius of curvature of the rail head 59 and the radius of curvature outer bearing surface 76 of the wheel 54. If there is a significant change in the mating surface when the wheel is displaced, then there will be a tremendous amount of force placed on the portion of the outer bearing surface 76 that is in contact with the rail head. This point load situation must be avoided.

The curvature of the rail heads 59 and the outer bearing surfaces 76 of the wheels 54 determines the shape and surface area of the contact area of mating surface between the rail head 59 and the outer bearing surface 76. When the radius of the outer bearing surface 76 of the wheel 54 and the convex rail head 59 are equal, the contact area is a line. When the radius of the outer bearing surface 76 is greater than the radius of the rail head 59, the contact area is an ellipse with the major axis of the ellipse being transverse to the rail head 59. When the outer bearing surface 76 is cylindrical (i.e., flat) and the rail head 59 has a convex shape, the contact area is an ellipse that is smaller and more circular than the ellipse formed when the radius of the outer bearing surface 76 is greater than the radius of the rail head 59.

In the preferred embodiment, the radius of the outer bearing surface 76 is greater than the radius of the rail head 59. This configuration is used to lessen the contact stresses placed on the outer bearing surface 76.

The radius of curvature of the rail head 59 is a standard feature as defined by the rail manufacturers (one rail which can be used in the present invention is a 175 pound/yard ("lb/yd") crane rail having an 18 inch radius). The actual rail selected is based on various factors such as cost, weight, and applied loads.

The diameter of the wheel is also selected based upon the same factors as those use to select the rail. However, an additional factor that is considered is the magnitude of the horizontal displacement of the rail attached to the circumturret structure 22 with respect to the rail attached to the turret structure 20. It is important that the angular tilt of the wheel be kept to a minimum, therefore the larger the wheel, the smaller the angular tilt. However, this principle does not mean that very large wheels should be used because there is a point where the rail cannot support the larger capacity load of a larger wheel.

The concave contour of the outer bearing surface 76 of the wheel is circular in shape and has a radius that is greater than the radius of the rail head 59. The radius of the rail head 59 offers the excellent capabilities to absorb horizontal rail displacements without changing the contact interface between the wheel and the rails. The wheel 54 merely rolls across the rail head 59 as the rails 50, 52 move horizontally with respect to each other. The radius of the outer bearing surface 76 of the wheel 54 is determined such that when the rails 50, 52 are horizontally displaced to the maximum value the contact area ellipse from the highest loaded wheel is still substantially within the surface of the rail head 59. This results in the optimum rail to wheel interface for rotating the vessel 10 around the turret 20.

FIG. 10 shows a wheel 54 when the vessel 10 is in a hog or sag condition. As shown in FIG. 10, the upper rail 50 is no longer directly vertically aligned with the lower rail 52 and the wheel 54 is thus slightly displaced. That is, the angle of the wheel 54 has shifted slightly so that the wheel 54 is slightly slanted from a vertical axis 78 extending from the rail 50 attached to the turret structure 20. As was shown and discussed above with respect to FIGS. 4 and 5, when the vessel 10 is in a hog or sag condition or the degree of hog or sag changes due to the wind, wave, and current forces exerted on the vessel 10, the orientation of the rail 52 on the circumturret structure 22 changes relative to the rail 50 attached to the turret structure 20. This shift in orientation of the rails causes the wheel 54 to be tilted. This shift in orientation between the rail on the circumturret structure and the turret structure can be seen by comparing FIGS. 9 and 10. FIG. 9 shows the rails 50, 52 vertically aligned on axis 78, which occurs when the vessel 10 is neither in a hog condition or a sag condition. FIG. 10 shows the rails aligned on tilted axis 80, which is a result of the change in shape of the circumturret structure 22 causing the rail 52 to shift. This change in shape of the circumturret structure 22 causes the rail 52 to shift away from axis 78, thereby tilting the wheel 54. However, because of the flanges 74 on the wheel 54, the wheel 54 will not disengage from the rails 50, 52. Also, because of the relative radial shapes of the rails 50, 52 and wheel 54, the amount of surface contact between the wheel 54 and the rails 50, 52 is not greatly reduced, and the wheel-to-rail contact stresses do not significantly change. Consequently, even when the vessel 10 is in a hog or sag condition, the circumturret structure 22 can be rotated about the turret structure 20.

Radial Roller Support

Now, with reference to FIGS. 7 and 11–14, the radial roller support assembly 38 will be described.

The radial roller assembly 38 is designed to provide continuous radial support to the turret structure 20. When the vessel 10 is in a hog or sag condition, the forces exerted on the vessel 10 by the wave and current forces will dynamically change the degree of hog or sag of the vessel 10. As the shape of the vessel 10 is dynamically changed, the shape of the circumturret 22 is dynamically changed. In order to provide the necessary constant radial support to the turret structure 20, the radial roller assembly 38 must continuously adjust so that it will always be in proper contact with the turret structure 20.

Figure 11:
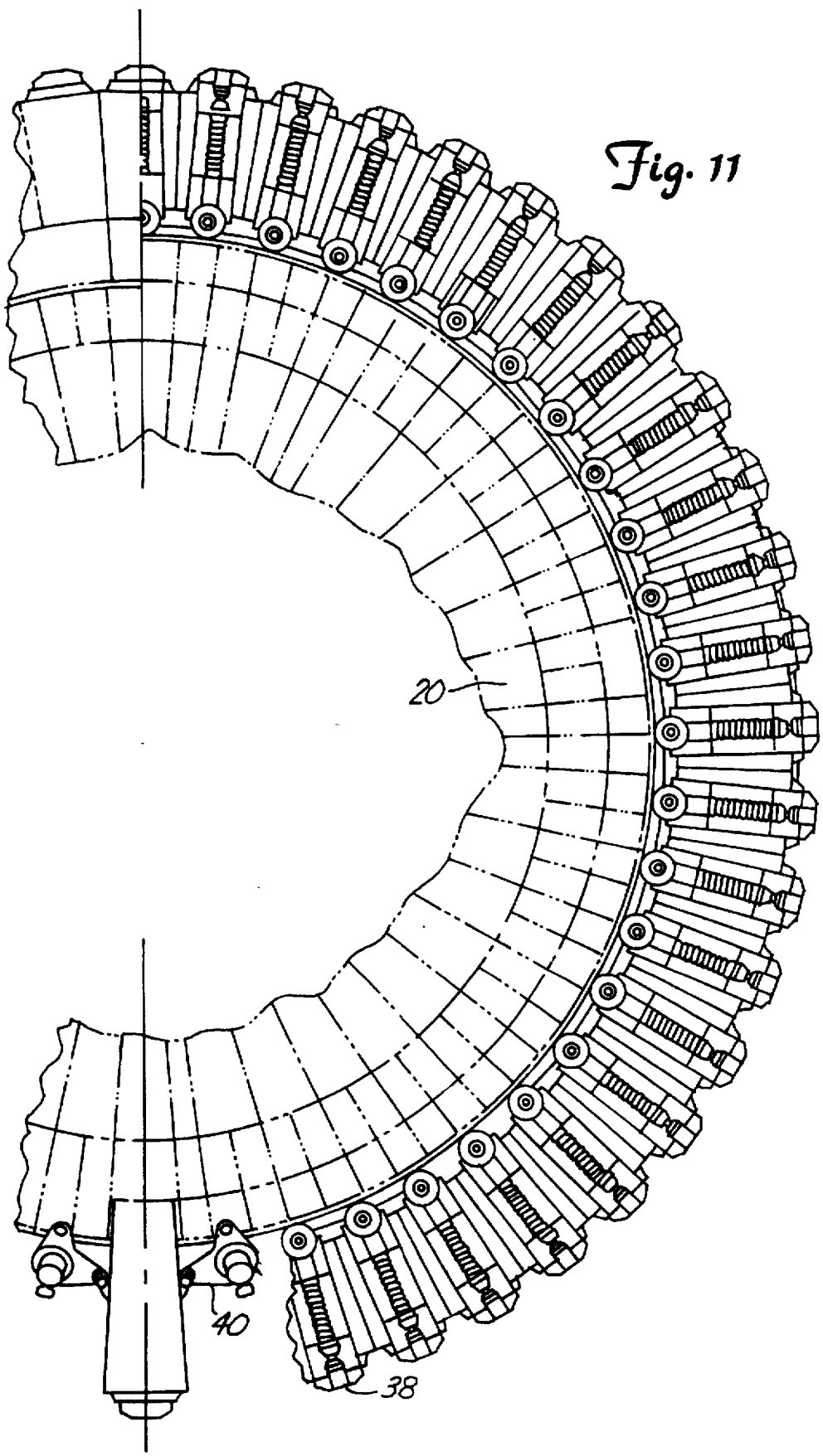
FIG. 11 is a top plan view of a plurality of radial roller assemblies mounted on the circumturret structure.

As shown in FIG. 7, the radial roller assembly 38 is mounted on the circumturret structure 22 and provides radial support to the turret structure 20. FIG. 11 shows in detail one section of the circumturret structure 22 having a set of radial roller assemblies 38 to radially support the turret structure 20 and the drive mechanism 40 for driving the circumturret structure 22 around the turret structure 20 (which will be described later in this specification).

Figure 12:
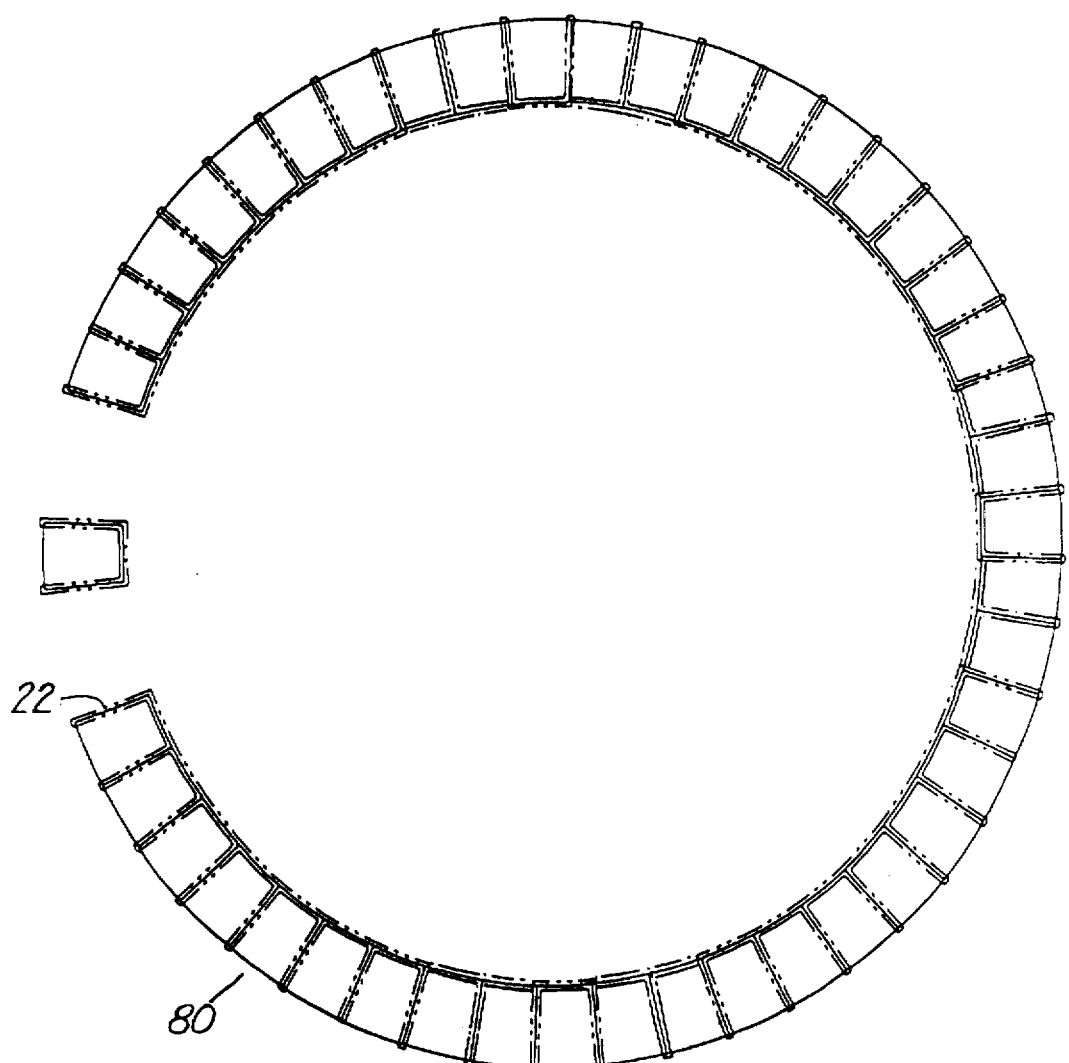
FIG. 12 is a simplified top plan layout of the circumturret structure.

FIG. 12 shows a simplified layout of the full circumturret structure 22 to illustrate the plurality of containers where the radial roller assemblies 38 are mounted. The layout shows a plurality of mount structures 80 for mounting a plurality of radial roller assemblies 38. In the preferred embodiment, forty-four (44) radial roller assemblies 38 are used to support the turret 20 in the radial direction. However, any number of radial roller assemblies 38 may be used to support the turret 20.

Figure 13:
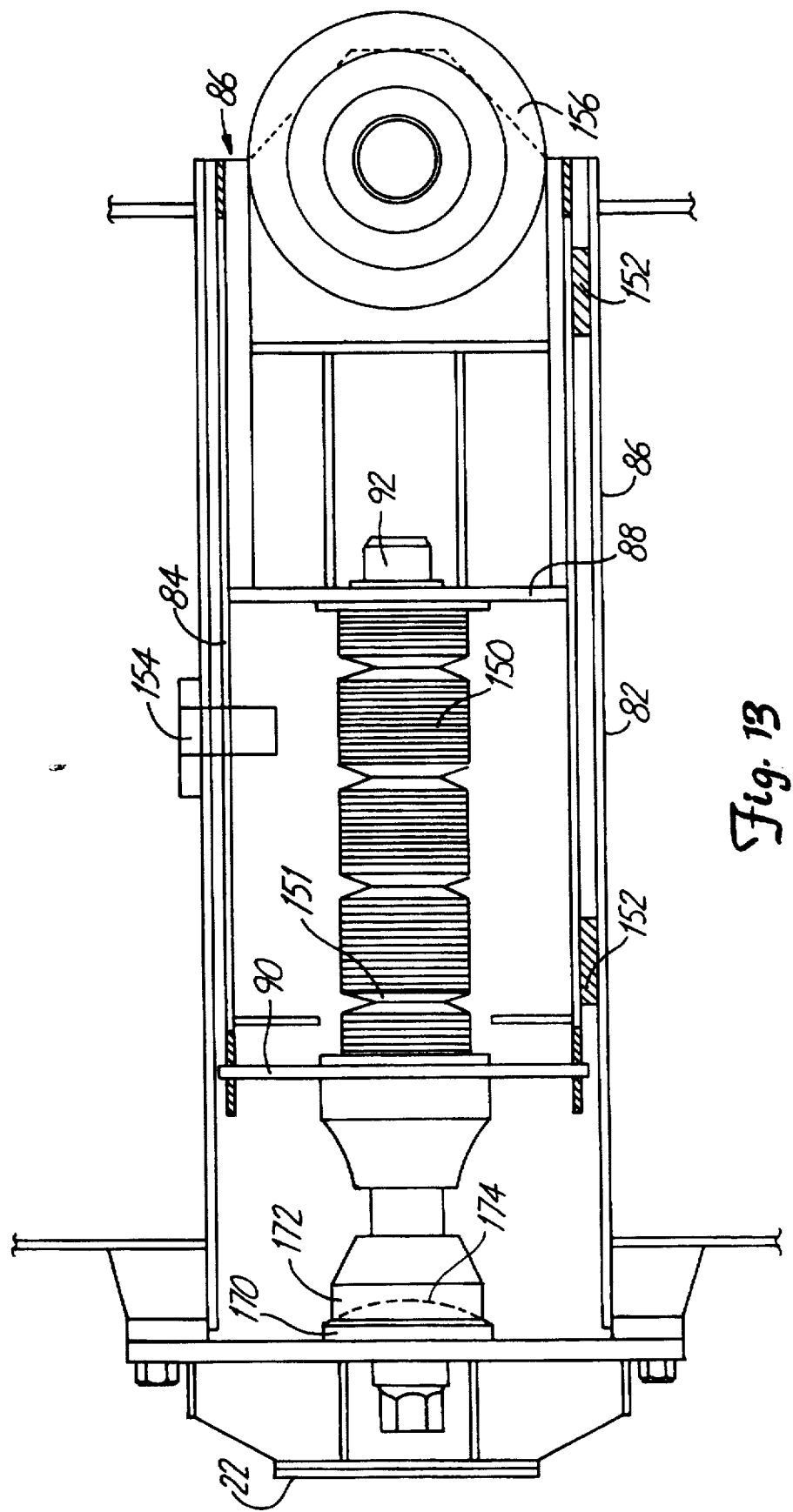
FIG. 13 is a fragmentary top plan view of the radial roller assembly.
Figure 14:
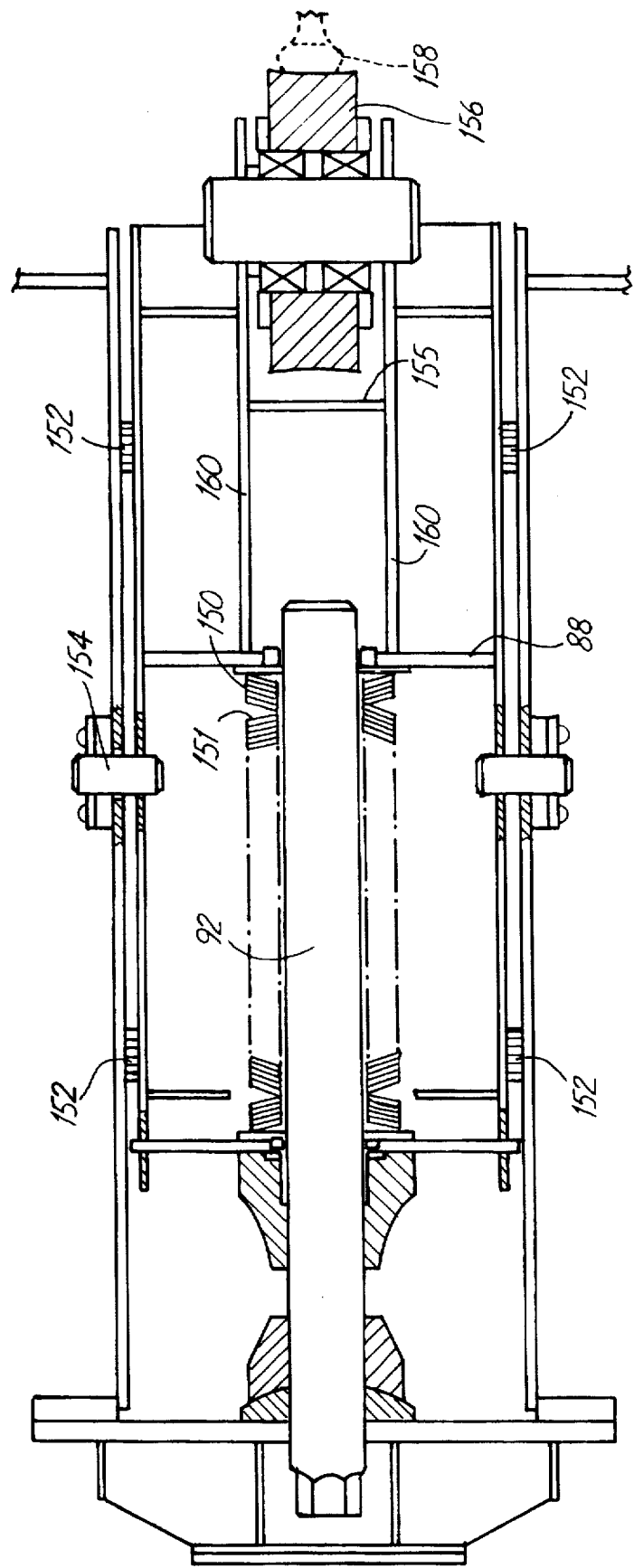
FIG. 14 is a side elevational view of the radial roller assembly.

With reference to FIGS. 13 and 14, the components of a radial roller assembly 38 will be described. FIG. 13 shows a top view of the radial roller assembly 38. The radial roller assembly 38 comprises an outer housing 82 and an inner support carriage 84. The outer housing 82 is connected to the circumturret 22. In the preferred embodiment, the outer housing 82 has a cylindrical shape.

The inner support carriage 82 comprises a wheel support assembly 86 for supporting a wheel 156, a first plate 88, and a second plate 90. The inner support carriage 84 is located within the outer housing 82, and also, in the preferred embodiment, has a cylindrical shape. A bearing structure 152 is interposed between the outer housing 82 and the inner support carriage 84 for slidably connecting the inner support carriage 84 and the outer housing 82. In the preferred embodiment, the bearing structure 151 comprises nylon bearing pads, which allows the inner support carriage 84 to slide easily inside the outer housing 82.

A guide pin 154 is used to connect the outer housing 82 and the inner support carriage 84. This guide pin 154 prevents the inner support carriage 84 from rotating within the outer housing 82. Thus, the guide pin 154 is used to maintain the orientation of the inner support carriage 84 such that the wheel 156 is in contact with the circular rail radial support rail 158 that is attached to the turret 20. In particular, the guide pin 154 ensures that the outer bearing surface of the wheel 156 is in contact with the circular radial support rail 158.

The wheel support assembly 86 comprises a pair of metal strips 160 to which the wheel 156 is rotatably connected. The metal strips 160 are connected to a third plate 155, which is connected to the first plate 88. The first plate 88 of the wheel support assembly 86 has a bore for receiving a guide shaft 92. The guide shaft 92 serves as a containment device for springs 150 which have a circular hole for slidably receiving the guide shaft 92.

The springs 150 have a bore for receiving the guide shaft 92. There are a plurality of springs 150 placed on the guide shaft 92. The number of springs that need to be placed on a guide shaft 92 depends on (1) the amount of force or load to be supported; and (2) the amount of deflection (i.e., radial displacement) in the turret 20. In the preferred embodiment, belleville springs are used. Preferably, eight stacks of belleville springs, with each stack having seven belleville springs are used. As shown in FIGS. 13 and 14, each stack of belleville springs are oriented such that the front face 151 of a stack faces the front face 151 of another stack. In addition to belleville springs, helical springs and elastomeric springs may also be used. The springs 150 are used to maintain the turret 20 in the center of the circumturret 22 when the vessel 10 is not experiencing any external forces such as wind, currents, and waves, whereby the mooring lines 42 are not resisting these forces.

Continuing to refer to FIG. 13, the guide shaft 92 is connected to the circumturret thrust ball bushing 170 and a thrust socket nut 92. The ball surface 174 of the thrust ball bushing 170 and the internal ball of the thrust socket nut 172 allows the guide shaft 92 to tilt slightly. This attachment structure limits the chance of the guide shaft 92 cracking due to fatigue.

FIG. 14 shows a side view of the radial roller assembly 38 mounted to the circumturret structure 22 with the wheel 156 being in contact with the rail 158. The rail 158 is also a standard rail which is bent into a circle and attached to the outer surface 26 of the turret 20. Because the distortions of the vessel 10 have less displacing effect in the direction of its rotational axis, this wheel 156 does not have to be constructed with flanges as with the wheels in the hook and load roller rail assemblies 34, 36. The rails and the wheels for this assembly may have flat surfaces.

As described previous with reference to FIGS. 2–5, when a vessel 10 is in a hog or sag condition, the circumturret structure 22 is elliptical rather than circular. The forces exerted on the moored, floating vessel 10 by the wind, wave, and current forces will cause the elliptical shape of the circumturret structure 22 to vary. This varying elliptical configuration will place a great degree of stress on certain radial rollers 38 and will try to pull away from other radial rollers.

When there is a load placed on the wheel 156 because of the configuration of circumturret structure 22, the load is transferred from the wheel 156 through the wheel support assembly 86 and the first plate 88 to the springs 150. When the circumturret structure 22 is "pinching" the turret 20, i.e., part of the circumturret structure 22 is pushing against the turret 20, a load is placed on the radial roller assembly 38. The amount of compression by the various elements in the radial roller assembly 38 depends on the amount of force being applied to the radial roller assembly 38.

Due to the hog or sag condition of the vessel 10, when a portion of the circumturret structure 22 pulls away from the turret structure 20, the wheel 82 of the radial roller assembly 38 must be kept in contact with the rail 96 attached to the turret structure 20, thereby providing continuous radial support to the turret structure 20. In order to continue to radially support the turret structure 20, springs 150 expand and the inner support carriage 84 slides outwardly towards the wheel 156, thereby enabling the wheel 82 to stay in contact with the rail 158. When the circumturret structure 22 is pulling away from the turret structure 20, the load placed on the springs is less than the load placed on the springs 150 when the vessel 10 is not in a hog or sag condition. Consequently, regardless of the dynamic changes caused to the shape of the circumturret structure 22 due to the changes in the hog or sag configuration of the vessel 10 by the wave and current forces exerted on the vessel 10, each radial roller assembly 38 can adjust, i.e., expand or contract, to continuously provide equally distributed radial support to the turret structure 20.

The loads supported by the springs 150 are passively equalized among the radial roller assemblies. Consequently, no one set of springs 150 in a radial roller assembly must carry all the load.

In another embodiment, the outer housing 82 and the inner support carriage 84 may be shaped in a rectangular or square parallelogram. In this embodiment, a guide pin is not necessary because the shape of the outer housing 82 and the inner support carriage 84 prevent the inner support carriage from rotating within the outer housing.

Drive Mechanism

The drive mechanism 40 shown in FIG. 11 will now be described. The drive mechanism 40 is used to turn the vessel 10 around the turret structure 20. In the preferred embodiment, there are eight individual drive mechanism's 40. However, the number of drive mechanism's used in the apparatus may vary. With reference to FIG. 11, there are two drive mechanism's connected to each mounting column 130.

Figure 15:
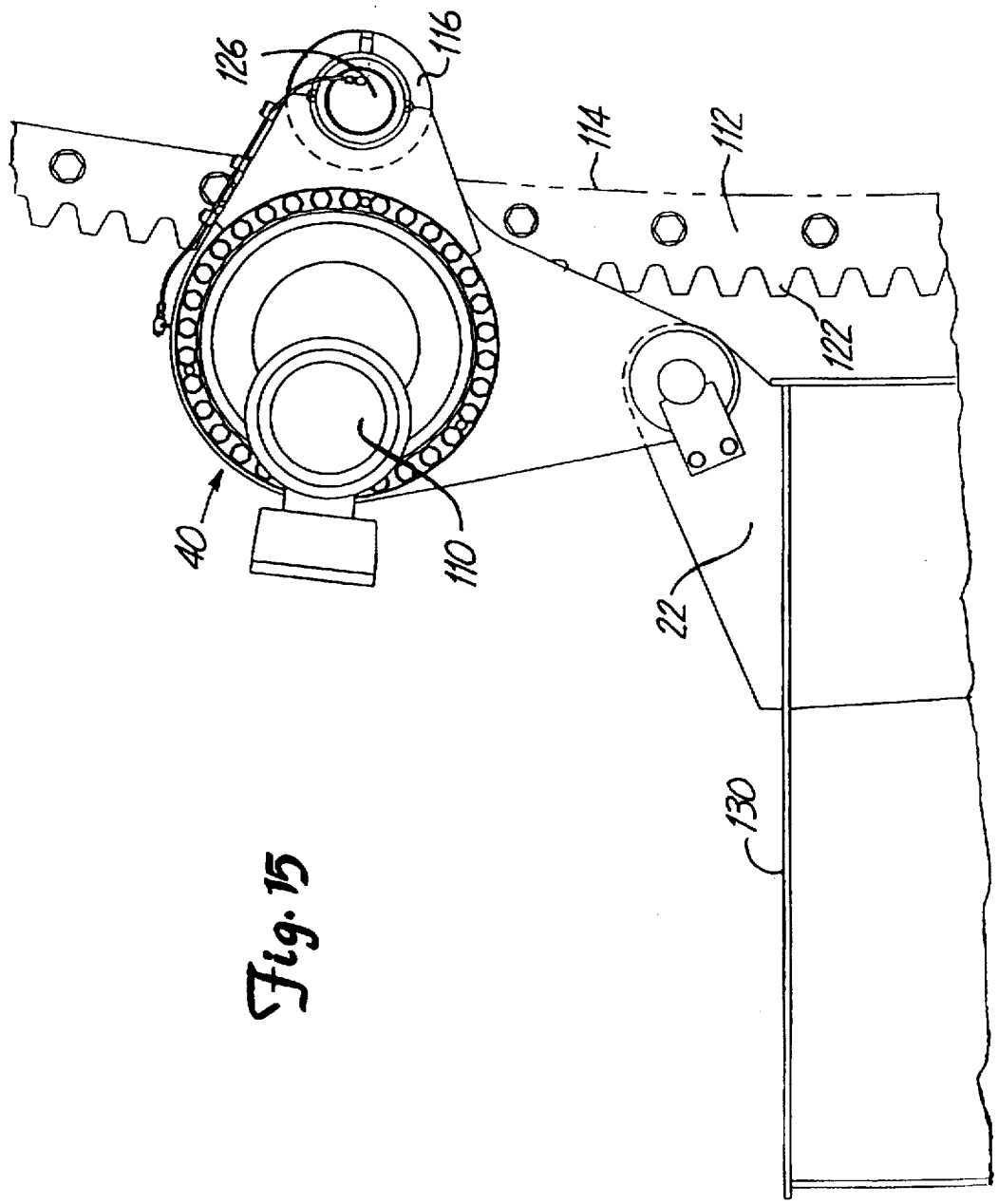
FIG. 15 is a fragmentary view of the drive mechanism, drive gear, cam, and cam follower.

As shown in FIG. 15, the drive mechanism 40 comprises a motor 110 with an attached pinion gear 120. A drive gear 112 on the turret 20 having drive gear teeth 122 is driven by the drive mechanism 40. A cam surface 114 and a cam follower 116 are used to cause the teeth 122 of the drive gear 112 to engage the pinion gear 120 (shown in FIG. 16). The motor 110 is pivotably connected to the circumturret structure 22. This pivotable connection allows the pinion gear 120 to stay in contact with the drive gear 112 as the shape of the circumturret structure 22 dynamically changes due to wind, wave, and current forces exerted on the vessel 10.

The cam follower 116 is also connected to the circumturret structure 22. The shaft 126 of the cam follower 116 has a slight eccentricity. In the preferred embodiment, the shaft 126 of the cam follower 116 has an eccentricity of a few millimeters when the turret diameter is approximately 20 meters. This eccentricity is to accommodate or adjust for the backlash and center distance between the motor 110 and the drive gear 112 due to manufacturing tolerances. The distance between the motor 110 and the drive gear 112 dynamically change as the shape of the circumturret structure 22 dynamically changes due to wind, wave, and current forces exerted on the vessel 10.

Figure 16:
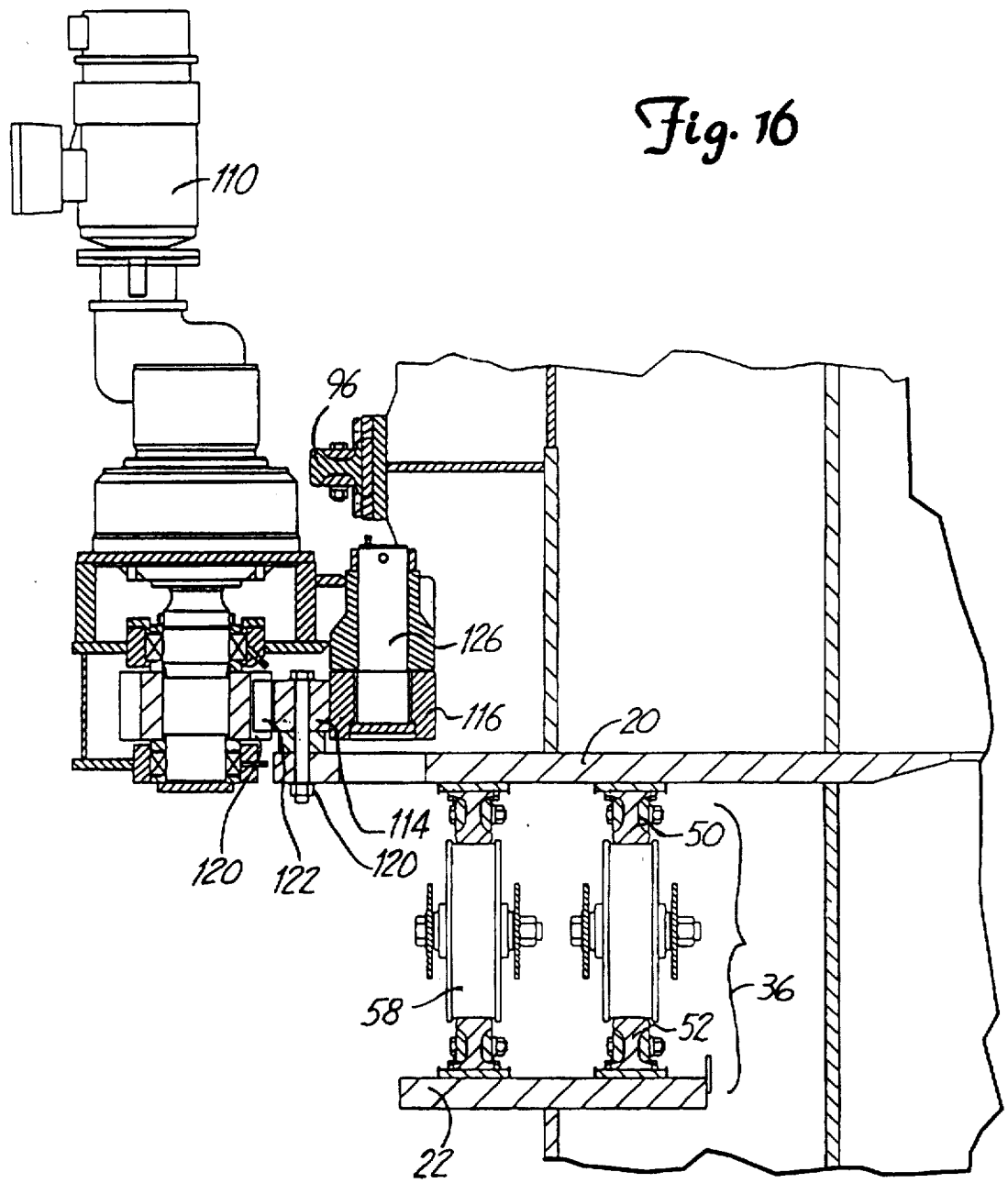
FIG. 16 is a fragmentary side elevational view of the motor, pinion, drive gear, cam, and cam follower.

With reference to FIG. 16, the interaction between the motor 110, the drive gear 112, the cam surface 114, and the cam follower 116 will be described. FIG. 16 shows the motor 110 mounted in the circumturret structure having a pinion gear 120 engaging a drive gear tooth 122 of the drive gear 112. Also, the cam surface 114, which has a circular shape is in contact with the cam follower 116. The cam follower 116 is connected to the circumturret structure 22. This cam follower 116 is designed to counteract the separation force that exists at the point where the pinion 120 contacts the drive gear tooth 122.

When the motor 110 is turning the pinion gear 120, circumturret structure 22 will move around the turret 20, because the wheels 54, 48 between the turret 20 and the circumturret structure 22 will rotate to facilitate the moving of the circumturret structure 22.

In operation, when wind, wave, and current forces cause a vessel 10 to turn, the mooring lines 42 have a tendency to twist. The operator of the vessel 10 can then enable the motor 110 to drive the drive gear 112. When the drive gear tooth 122 engages the pinion gear 120 and the motor 110 is enabled, the circumturret structure 22 and thus the vessel 10 is moved around the turret 20. The cam follower mechanism 116 (1) ensures contact between the drive gear 112 and the pinion 120 by counteracting the separation force generated at the contact point of the drive gear and the pinion 120; and (2) accounts for the backlash and distance between the cam follower 116 and the motor 110. Regardless of the hog or sag condition of the vessel 10, (1) the radial roller assembly 38 will radially support the turret structure 22; and (2) the wheels upon which the circumturret structure 22 revolves around the turret structure 20 will not be derailed.

While the preferred embodiment of the present invention has been described, it should be appreciated that various modifications may be made by those skilled in the art without departing from the spirit and scope of the present invention. Accordingly, reference should be made to the claims to determine the scope of the present invention.

What is claimed is:

1. A radial roller assembly for passively providing radial support to a cylindrical turret, which is moored to the sea bottom for rotation of a vessel around the turret, where the vessel includes a circumturret structure passing through the vessel and surrounding the turret and the radial roller assembly is adapted to be mounted to the circumturret structure, the radial roller assembly comprising:

(a) an outer housing attached to the circumturret structure;

(b) an inner support carriage located within the outer housing, the inner support carriage comprises a first plate, a second plate, and a wheel support assembly, with each of the first and second plates having a bore;

(c) a guide shaft attached to the outer housing and slidably connected to the first and second plates; and (d) a plurality of springs slidably connected to the guide shaft, the springs located between the first and second plates.

2. The radial roller assembly of claim 1, wherein the outer housing and the inner support carriage have a cylindrical shape.

3. The radial roller assembly of claim 2, further comprising a guide pin connecting the outer housing and the inner support carriage.

4. The radial roller assembly of claim 1, further comprising a bearing structure interposed between the outer housing and the inner support carriage.

5. The radial roller assembly of claim 4, wherein the bearing structure comprises nylon bearing pads.

6. The radial roller assembly of claim 1, wherein the guide shaft is tiltably attached to the outer housing.

7. The radial roller assembly of claim 6, wherein a thrust ball bushing and a thrust socket nut are used to attach the guide shaft to the outer housing.

8. An apparatus for passively providing radial support to a cylindrical turret, which is moored to the sea bottom for rotation of a vessel around the turret, where the vessel includes a circumturret structure passing through the vessel and surrounding the turret, the apparatus comprising:

at least two radial roller assemblies for radially supporting said turret to resist horizontal forces, each said radial roller assembly comprising:

(a) an outer housing attached to the circumturret structure;

(b) an inner support carriage located within the outer housing, the inner support carriage comprises a first plate, a second plate, and a wheel support assembly, each of the first and second plates having a bore;

(c) a guide shaft attached to the outer housing and slidably connected to the first and second plates; and (d) a plurality of springs slidably connected to the guide shaft, the springs located between the first and second plates;

a circular radial support rail attached to the turret structure;

a wheel which has its outer bearing surface in contact with the rail; and the wheel support assembly for supporting the wheel, whereby the springs compress and expand between the first and second plates to maintain the wheel in constant contact with the rail, thereby providing continuous radial support to said turret.

9. The apparatus of claim 8, wherein the outer housing and the inner support carriage have a cylindrical shape.

10. The apparatus of claim 9, further comprising a guide pin connecting the outer housing and the inner support carriage.

11. The apparatus of claim 8, further comprising a bearing structure interposed between the outer housing and the inner support carriage.

12. The apparatus of claim 11, wherein the bearing structure comprises nylon bearing pads.

13. The apparatus of claim 8, wherein the guide shaft is tiltably attached to the outer housing.

14. The apparatus of claim 13, wherein a thrust ball bushing and a thrust socket nut are used to attach the guide shaft to the outer housing.

15. An apparatus for rotating a vessel around a cylindrical turret moored to the sea bottom, where said vessel includes a circumturret structure passing through said vessel and surrounding said turret which is moored to the bottom, said apparatus comprising:

(a) a hook roller assembly for supporting said turret structure from moving vertically upward;

(b) a load roller assembly for rotatably supporting said turret structure on said circumturret vessel structure;

(c) a plurality of radial roller assemblies mounted to said circumturret vessel structure for supporting said turret structure against horizontal forces;

(d) a drive gear having teeth connected to surround said turret structure with a cam surface adjacent and opposed to the teeth of the drive gear;

(e) a pinion gear connected to said circumturret vessel structure, said pinion gear engaging said drive gear; and (f) a cam follower connected to said circumturret structure opposite the teeth of said pinion gear to counteract a separation force between said drive gear and said pinion, arising when a motor drives the pinion gear and the circumturret structure rotates in relation to the turret structure, wherein the cam follower has a shaft with an eccentricity.

16. The apparatus of claim 15, wherein each radial roller assembly comprises:

(a) an outer housing attached to the circumturret structure;

(b) an inner support carriage located within the outer housing, the inner assembly, each of the first and second plates having a bore;

(c) a guide shaft attached to the outer housing and slidably connected to the first and second plates; and (d) a plurality of springs slidably connected to the guide shaft, the springs located between the first and second plates.

* * * * *